United States Patent [19]
Teicher et al.

[11] Patent Number: 5,847,703
[45] Date of Patent: Dec. 8, 1998

[54] BROWSING SYSTEM METHOD AND APPARATUS FOR VIDEO MOTION PICTURES

[75] Inventors: Mordechai Teicher, Saba; Eitan Lev, Even Yehuda; Noam Cohen, Binyamina, all of Israel

[73] Assignee: Vsoft Ltd., Yokneam Ilit, Israel

[21] Appl. No.: 887,637

[22] Filed: Jul. 3, 1997

[51] Int. Cl.[6] ............................. H04N 7/14; H04N 5/445; H04N 1/02

[52] U.S. Cl. ................................. 345/327; 348/7; 348/10; 348/12; 348/564; 455/4.2; 455/5.1; 455/6.2

[58] Field of Search ..................... 345/326, 327, 345/328; 348/6, 7, 10, 12, 13, 383, 563–568, 722, 906, 584, 588; 455/3.1, 4.1, 4.2, 5.1, 6.1, 6.2; 386/1, 4, 46, 52

[56] References Cited

U.S. PATENT DOCUMENTS

5,440,348  8/1995  Peters et al. ..................... 348/722 X
5,537,153  7/1996  Shigihara ......................... 348/564
5,633,683  5/1997  Rosengren et al. ................ 348/564 X

*Primary Examiner*—Andrew I. Faile
*Assistant Examiner*—John W. Miller
*Attorney, Agent, or Firm*—Benjamin J. Barish

[57] ABSTRACT

In a method and apparatus for browsing through a motion picture in order to locate desired segments in the motion picture, frames are selected from sequential parts of the motion picture according to predetermined sampling critera, e.g., "by time", "by tag" or "by change". Each selected frame is reduced in size such that the screen can accommodate the simultaneous display of "n" frames. The frames are displayed sequentially at "n" sequential locations on the screen according to a predefined closed loop, each frame being displayed in its respective location for a time interval starting with a time delay "$t_D$" after the start of the display of the frame at the preceding location in the loop and continuing until the loop has been completed with another frame displayed in its respective location. Thus, only the selected frames need be viewed in order to locate a desired segment, but each selected frame may be viewed for an extended time interval, equal to "$nt_D$".

30 Claims, 7 Drawing Sheets

BROWSING SYSTEM METHOD AND APPARATUS FOR VIDEO MOTION PICTURES

FIELD AND BACKGROUND OF THE INVENTION

The present invention relates to video motion pictures, and in particular to a method and apparatus for browsing through video motion pictures for locating desirable information.

Video motion pictures can be stored in analog form, usually on a VCR tape, or in digital form, on a computer disk. When stored digitally, the video motion picture is usually compressed to reduce storage space, the MPEG standard being widely used for such compression.

In many situations, the user wishes to locate a specific point or segment within the motion picture. One example is at home, for skipping a recorded commercial or finding a desired scene. Another example is in professional applications, such as news editing, security reviewing, or medical archives examining, where a desirable piece of information or segment is sought within a large volume of video data. The traditional method for locating desirable segments within a video motion picture is through techniques called "fast-forward" and "rewind", which accelerate the motion information displayed to the user by a selectable factor, in the forward or backward direction, respectively.

Fast-forward and rewind are the straightforward choice for analog tapes, as they can be implemented easily by accelerating the speed of the tape over the replay head. However, when using compressed digital video, fast-forward and rewind are very demanding both in real-time processing and communication rate, the latter aspect being critical in systems where the video information is stored on a central server and viewed in remote viewers communicating with the server. The challenges of fast-forward and rewind in MPEG-encoded video are described in, e.g., U.S. Pat. No. 5,521,630.

Fast-forward and rewind are also not necessarily the most efficient and convenient way for humans to browse through a motion picture. The need to follow-up a high-speed, unnatural motion, identify details, sort out irrelevant segments, and decide between important and unimportant details on the fly, may be tiresome and prone to errors to many, especially to professionals who need to spend hours in seeking desired pieces of video information within a much larger amount of video data.

OBJECT AND BRIEF SUMMARY OF THE INVENTION

The main object of the present invention is to provide a novel method and apparatus for browsing through video pictures in a convenient and efficient manner.

According to one aspect of the present invention, there is provided a method of browing through a motion picture by the use of a viewer having a screen, for locating desired segments in the motion picture, comprising: selecting frames from sequential parts of the motion picture according to at least one predetermined sampling criterion; reducing each of the selected frames in size such that the screen can accommodate the simultaneous display of a predetermined number "n" of frames; and displaying the frames sequentially at "n" sequential locations on the screen according to a predefined closed loop, each of the frames being displayed in its respective location on the screen for a time interval starting with a time delay "$t_D$" after the start of the display of the frame at its preceding location in the loop and continuing until the loop has been completed with another frame displayed in its respective location, such that only the frames selected according to the predetermined sampling criterion need be viewed in order to locate a desired segment in the motion picture, but each such frame may be viewed for an extended time interval, equal to the product of the number "n" and the time delay "$t_D$".

Preferably, the "n" frames are arranged according to a two-dimensional matrix, e.g., nine frames in a 3×3 matrix. The time delay "$t_D$" is preferably a predetermined one, from 0.2 to 5 seconds, for example approximately 0.5 seconds. The sampling rate may be 1:10, 1:100, 1:1000, or even higher, such that the browsing rate is reduced by the sampling factor, but each frame may be viewed for an extended time interval, e.g., 4.5 seconds when "n"=9, and "$t_D$"=0.5 in one described example.

Several embodiments of the invention are described below for purposes of example. In one described embodiment, the predetermined sample criterion is "by time", the frames being selected according to predetermined sampling time intervals "$t_s$" in the motion picture. Preferably, the selected time intervals are equally-spaced time intervals of between 1 and 20 seconds. A preferred example of such a time interval is approximately 5 seconds.

Another embodiment is described wherein the predetermined sampling criterion is "by tags", the selected frames being pre-tagged in the motion picture.

A further embodiment is described wherein the predetermined sampling criterion is "by change", the frames being selected when a predetermined characteristic of the frame changes from the preceding frame by a predetermined threshold. An example of the predetermined characteristic is a color characteristic of the frame. Preferably, in this embodiment, the frames are selected according to both a "by change" criterion, and by a "time limit" criterion, the selection being made according to whichever criterion occurs first in the sequential parts of the motion picture. Such a "time limit" criterion may be between 5 and 30 seconds, e.g., about 10 seconds for one particular application.

While the invention could be used for browsing through conventional-film motion pictures, it is particularly useful for browsing through video motion pictures stored in a compressed digital format, but could also be used with respect to video motion pictures stored in an analog format.

The invention also provides apparatus for browsing through motion pictures in accordance with the above method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
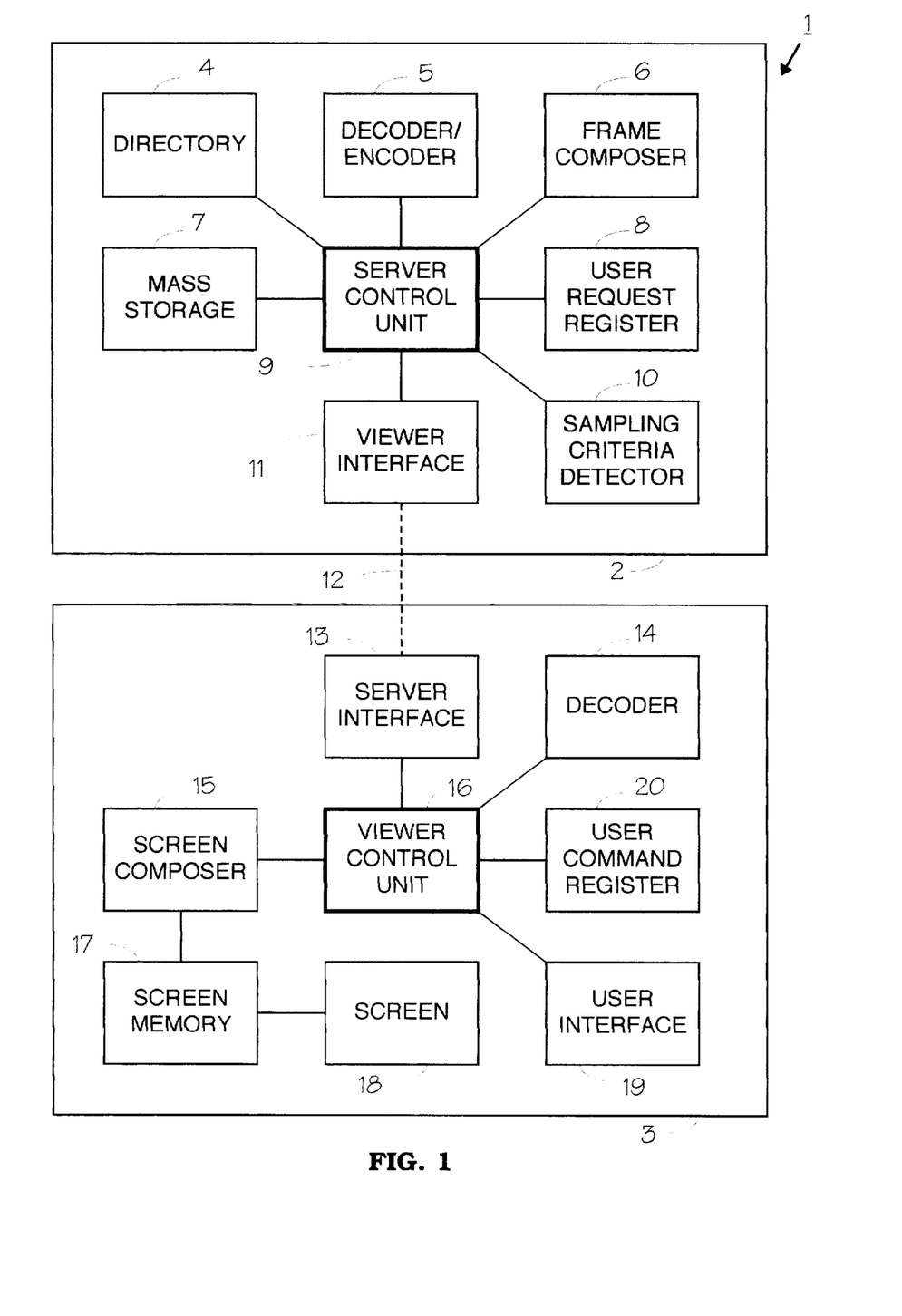
FIG. 1 is a block diagram of a preferred embodiment of the system according to the present invention.

Reference is now made to FIG. 1, describing a preferred embodiment of the present invention, generally designated 1. It includes a video server 2 which serves a plurality of viewers, each being represented herein by viewer 3 linked to server 2 via a communication link 12.

Server 2 uses a mass storage 7, preferably a high-capacity disk array, to store a number of video motion pictures in a compressed form, preferably using the MPEG standard. Directory 4 is a storage device containing link information between logical parameters, such as motion picture names, timing of each frame, etc., and the physical location of the recorded information in mass storage 7. Decoder/encoder unit 5 contains software and/or hardware known in the art for high-speed decompression/compression of video information stored on mass storage 7. User request register 8 stores the user request parameters received from viewers 3 to be executed by server 2 according to the procedures described below. Frame composer 6 includes known software, and/or known hardware, for high-speed composition of miniaturized video frames, selected and processed according to the criteria of FIG. 4 below. Sampling criteria detector 10 includes known software to select the video frames to be miniaturized by frame composer 6. Viewer interface 11 includes hardware and software for communication with each viewer 3 via communication link 12. Communication link 12 is any physical and/or electromagnetic link known in the art suitable for video communication. Server control unit 9 controls the operation of all units of video server 2, according to the procedures described hereinbelow.

Viewer 3 receives user commands through user interface 19, e.g., a keyboard. These commands are temporarily stored in user command register 20, and the relevant part thereof is sent to register 8 of server 2 via link 12. Decoder 14 decompresses compressed video information received from server 2. Server interface 13 includes known hardware and software for communicating with server 2 via link 12, for sending user commands thereto, and for receiving compressed video therefrom. Screen composer 15 composes full screen images (FIG. 2) from miniature frames received from server 2, in accordance to user commands from register 20. Screen memory 17 stores a bitmap of the screen composed by screen composer 15, while screen 18 displays the final composed picture according to the contents of screen memory 17.

Figure 2:
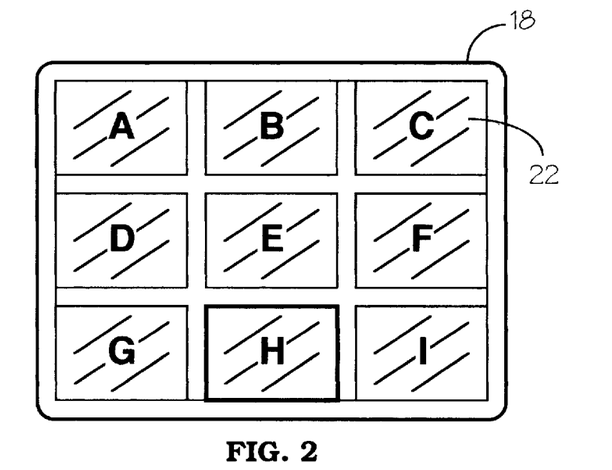
FIG. 2 is a schematic illustration of the picture displayed on a screen according to a preferred embodiment of the present invention.

FIG. 2 illustrates the image displayed on the screen 18. In this preferred embodiment, the screen is divided into nine sub-frames 22, designated A, B, . . . I. Each sub-frame displays, by its turn and for several seconds, a still image of a miniaturized frame, prepared by and received from frame composer 6 of server 2. In this example, sub-frame H is highlighted to show that this is the latest displayed sub-frame.

Figure 3A:
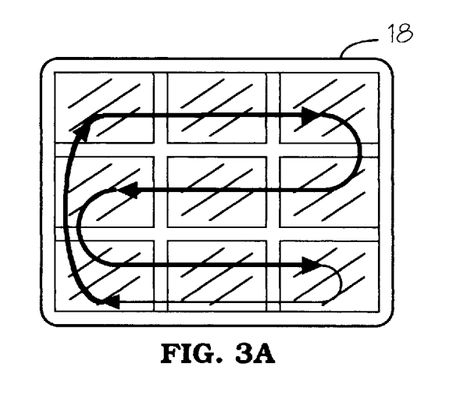
FIGS. 3A and 3B are schematic illustrations of two alternative display orders relating to FIG. 2.
Figure 3B:
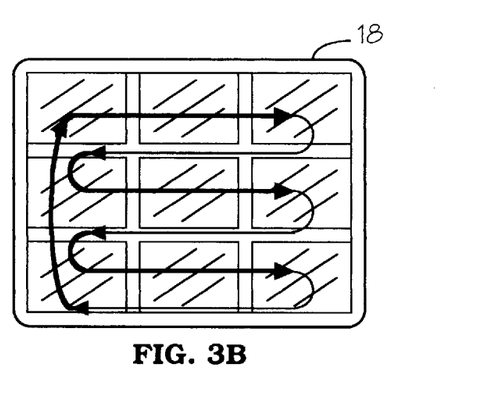

FIGS. 3A and 3B illustrate two selectable modes of browsing order. In FIG. 3A, the first frame selected by detector 10 and composed by composer 6 is displayed on sub-frame A; the next is displayed, after a time delay "$t_D$" of, say, half-a-second, on a sub-frame B, and then on C-F-E-D-G-H-I-A-B . . . . In FIG. 3B, the order is A-B-C-D-E-F-G-H-I-A-B . . . . The choice between the browsing order of FIGS. 3A, 3B (or alternative orders) is a matter of personal preference, and is selectable through user interface 19 of FIG. 1.

Figure 4:
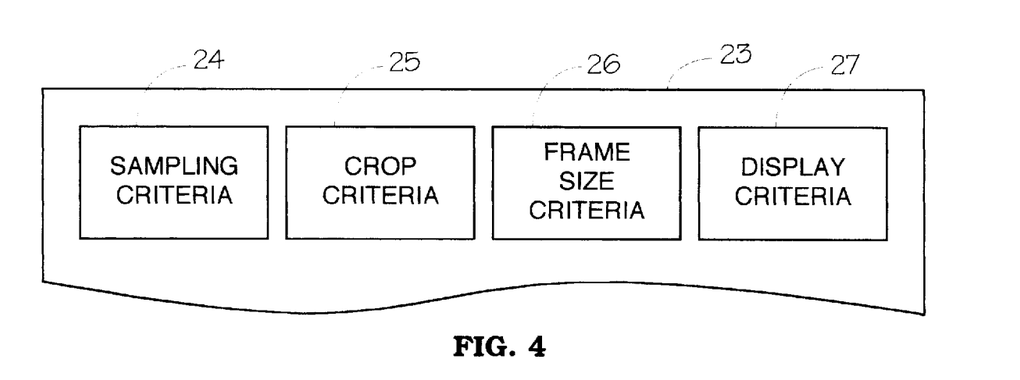
FIG. 4 is a block diagram of the main user-selectable operational criteria according to a preferred embodiment of the present invention.

FIG. 4 describes the main parameters 23 selectable by the user through user interface 19 and stored in user command register 20 or user request register 8, as appropriate. Sampling criteria 24 preferably include the following options:

(a) "By time", accompanied by a selectable source time interval, instructs sampling criteria detector 10 to select from directory 4 frames separated from each other by a specified sampling time "$t_S$", spaced five seconds from each other. The selected frames will preferably be the next displayable frame (sometimes also called "anchor frame", e.g., I-Frame in the MPEG compression standard).

(b) "By tag" relates to a preferred embodiment wherein the browsed video motion picture is prearranged for browsing, i.e., during its editing, special tags have been incorporated in its directory to identify the first frames of new scenes or important moments. In this case, sampling criteria detector 10 is selecting the next frame from director 4 by its having a tag.

(c) "By change" instructs sampling criteria detector 10 to identify scene changes in the browsed motion picture, which exceed a selectable threshold. In the present embodiment, the measured change relates to the relative percentage of the basic colors (e.g., Red, Green, Blue in an RGB scheme), the threshold being a parameter such as "20%, which implies selecting the first frame where the relative ratio between any of R/G, G/B or B/R changes by more than 20% in respect to the previous selected frame.

It would be noted that according to the present invention, browsing through a motion picture can be selected to be either in the forward or the backward direction (equivalent to "fast forward" or "rewind", respectively). Accordingly, whenever the term "next" is mentioned herein in respect to frames or pictures, it relates actually to either the next picture or frame or to the previous one, according to the browsing direction.

Crop criteria 25 allow the user to specify what part of the displayed video still will be cropped. Usually, most video motion pictures include the most relevant information around the center of the frame, so that browsing can be made by viewing a smaller part of the frame (for example, 15% of the margins at each of the left, right, top and bottom parts are eliminated) with lesser downscaling. The crop criteria preferably include four values of percentage 0–25% to be eliminated from each of the four margins. The crop criteria are stored in register 8 and used by frame composer 6 to compose the frame to be transferred to viewer 3.

Frame size 26, to be stored at both register 20 and register 8, allow the user to specify whether it is desired to see 4, 9, 16, etc., sub-frames 22 on screen 18 (FIG. 2), by selecting values "2×2", "3×3", "4×4", . . . respectively. It affects the operation of both frame composer 6 (determining the downscaling factor), and screen composer 15 (determining the size of sub-frame 22).

Display criteria 27 relate to the order of displaying sub-frames (e.g., according to FIG. 3A or FIG. 3b), and to the time delay $t_D$ between the display of two consecutive frames. The display criteria affect the operation of both the server (determining the rate of generating and transmitting frames) and the viewer.

Figure 5:
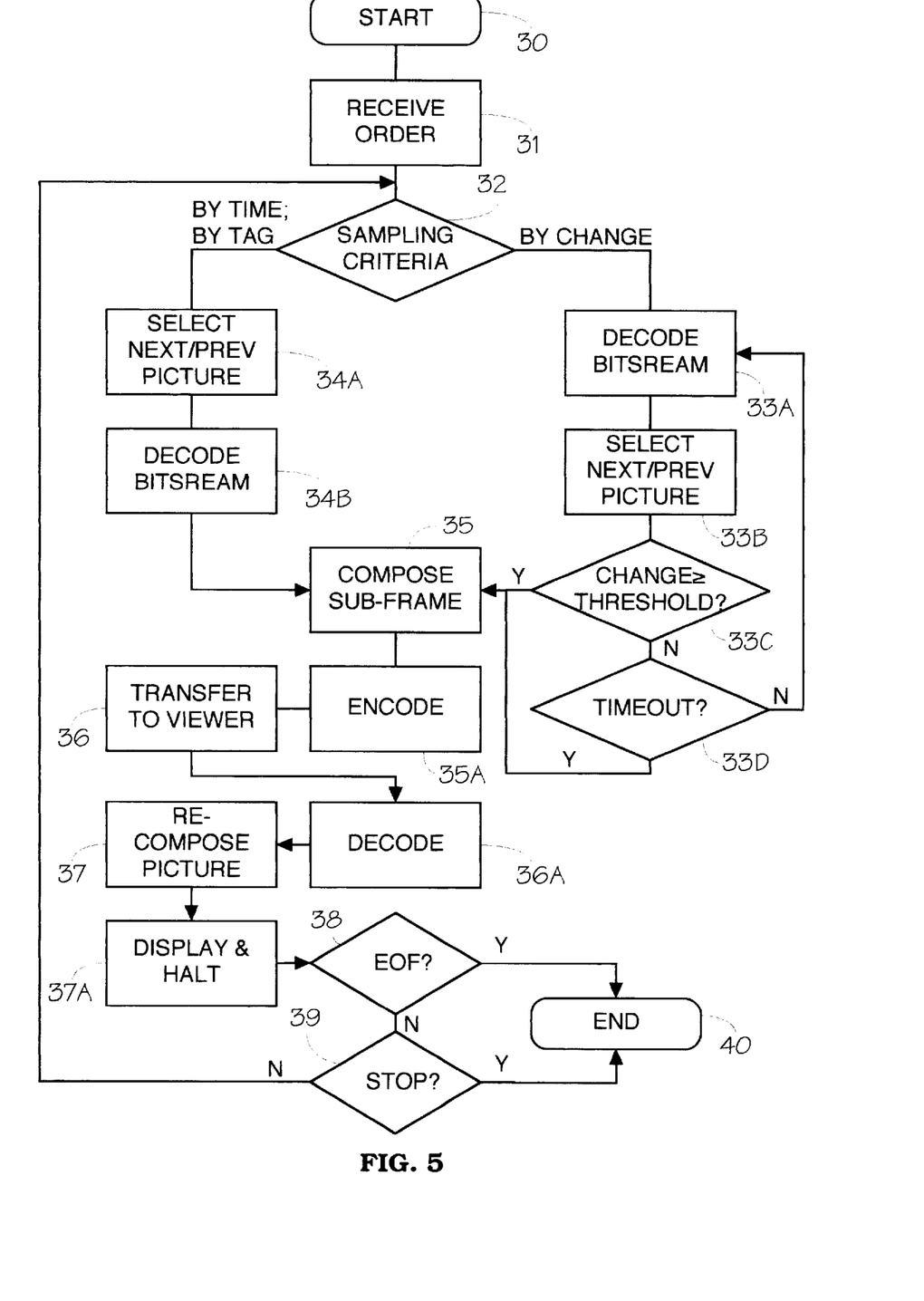
FIG. 5 is a flowchart describing the operation procedure of the system of FIGS. 1–4.

FIG. 5 describes the operation of the preferred embodiment of FIG. 1. In step 31, the user keys-in his browsing order through user interface 19. The order includes the parameters of FIG. 4, each parameter being either explicitly specified by the user, or implied by default values. The order also specifies whether the browsing is to be done in the forward or backward directions. In step 32, a decision is made according to the transition criteria (block 24 of FIG. 4). If the transition criteria is "by time" or "by tag", in step 34A directory 4 is accessed to retrieve the respective physical address of the next (or previous, in the case of backward browsing) required displayable frame, and in step 33 the respective bitstream is received from mass storage 7 and decoded to yield the desired picture. If the transition criteria in step 32 has been "by change", in 33 a continuous bitstream, representing a consecutive series of displayable frames, is received from mass storage 7, and each displayable frame (e.g., I-frame in the MPEG standard) is decoded. In 34B the amount of change, in respect to the previous selected frame, is measured, and if it exceeds a specified threshold, the current frame is selected as the desirable picture. If, however, the amount of change does not exceed the specified threshold when a specified time limit is reached (e.g., 30 seconds from the timing of the previous selected frame), then the next displayable picture after this time limit is preferably selected (step 34C).

After the desirable picture has been selected and decoded either through steps 34A-33 or 33-34C, in step 35 the picture is transformed into a sub-frame of reduced size, which include the steps of downscaling according to frame size 26 and cropping according to crop criteria 25 of FIG. 4, and finally compressing the sub-frame in 35A. In step 36 the compressed sub-frame is transmitted from server 2 to viewer 3. In step 36A the sub-frame is decompressed at the viewer, and in step 37 the sub-frame is added as a new sub-frame 22 (FIG. 2), according to the display order specified in display criteria 27 of FIG. 4; in step 37A the re-composed screen is then displayed and there is a halt for a period specified in display criteria 27 of FIG. 4, before making any further change in the picture displayed on screen 18. The halt function can be programmed into and executed by either viewer control unit 16 or server control unit 9. If either "end-of-file", i.e., end of the video motion picture, has been reached in step 38, or a user "stop" command has been received in step 39, the procedure reaches its end. Otherwise, seeking the next frame resumes at step 32.

Figure 6:
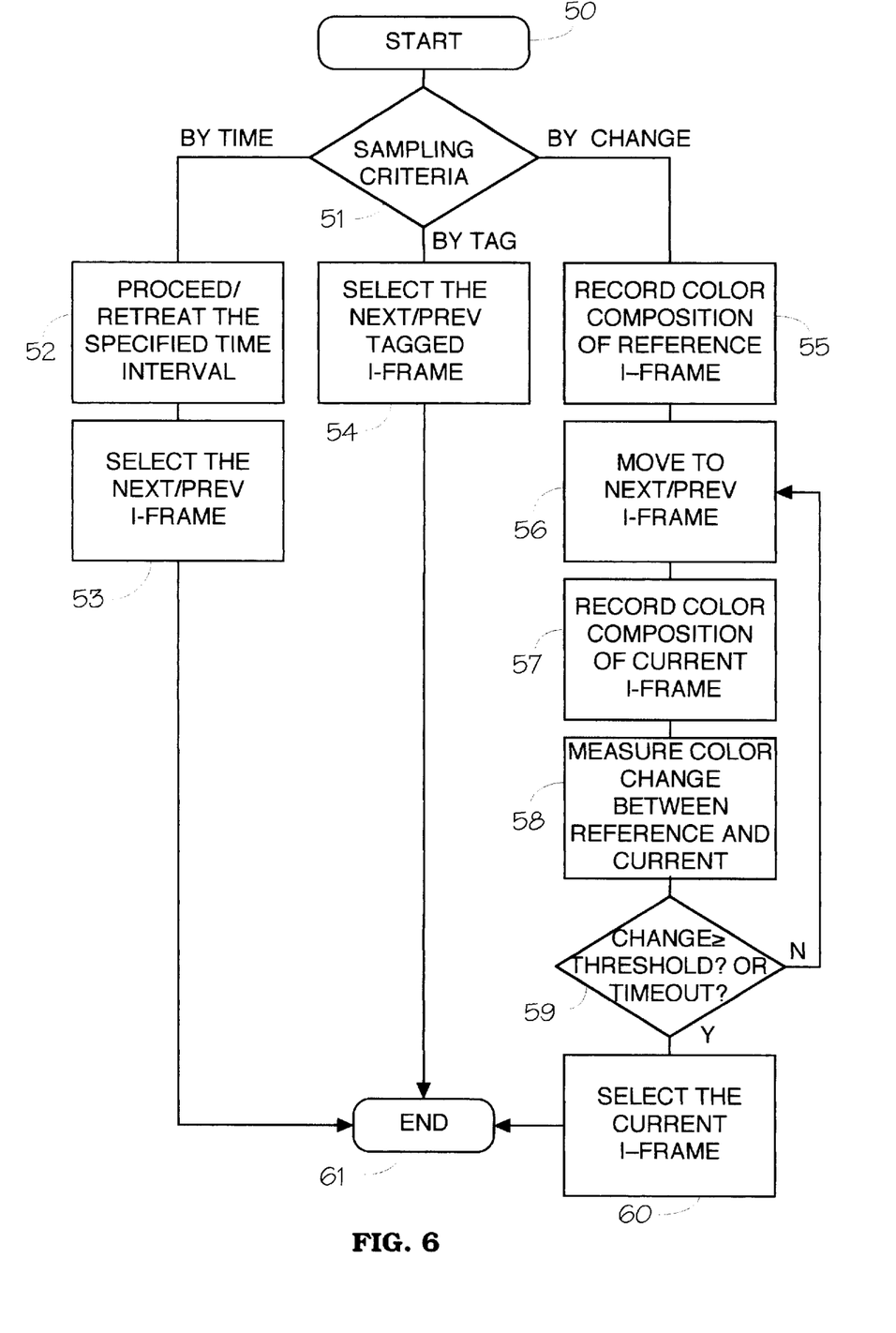
FIG. 6 is a flowchart describing in detail the picture selection routine which forms part of the procedure of FIG. 5.

FIG. 6 describes in more detail the picture selection procedure described in steps 32, 33, 34A and 34B of FIG. 4. In step 51, transition criteria 24 of FIG. 4 are examined. If "by time" has been selected, server control unit 9 (FIG. 1) is seeking (step 52) in directory 4 the frame whose timing differs from the timing of the preceding displayed frame by the time interval specified in transition criteria 24 of FIG. 4. In step 53, the next displayable frame, i.e., I-frame under the MPEG standard, is selected.

If "by tag" has been selected in step 51, in step 54 the next tagged I-frame is selected.

If "by change" has been selected in step 51, the color composition of the previous displayed frame is recorded as "reference" in step 55. Then the next I-frame is accessed in step 56, its color composition is recorded and analyzed in stepm 58. In step 58 the color change from the reference frame of step 55 is measured, preferably by comparing the amount of Red, Green and Blue pixels and the ratios R/G, G/B and B/R. In step 59, if any of said ratios changes by more than a specified threshold amount (e.g., 20%) relatively to the same ratio in the "reference" frame, or when a predetermined time interval runs out, this frame is selected in step 60; otherwise, the next I-frame is checked in step 56, until the required change is reached.

Figure 7:
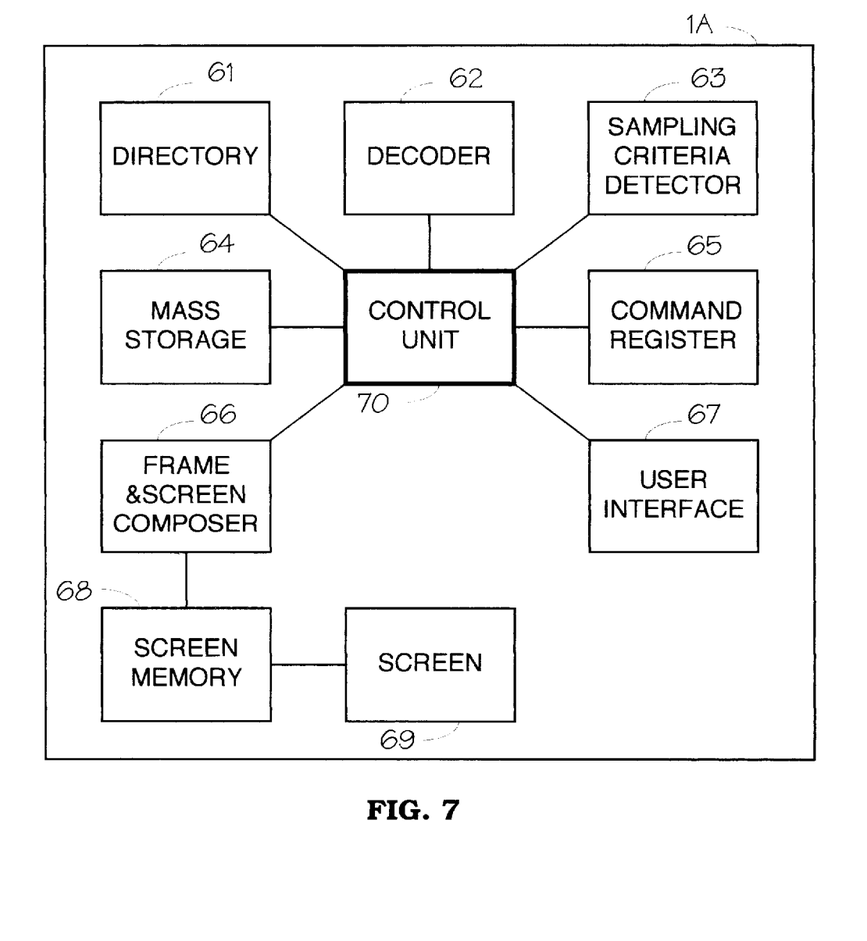
FIG. 7 is a block diagram of a second preferred embodiment of the present invention.

FIG. 7 describes a second preferred embodiment wherein the server and the view functions are integrated into one unit 1A controlled by a single control unit 70. Directory 61, sampling criteria detector 63, user interface 67, mass storage 64, screen memory 68 and screen 69 have the same functions as their respective units in the embodiment of FIG. 1. The functions of frame composer 6 and screen composer 15 of FIG. 1 are combined here into frame and screen composer unit 66. Decoder/encoder 5 and decoder 14 are replaced by decoder 62, as no re-compression and decompression are needed for transferring information between the server and viewer as in FIG. 1. Command register 65 integrates the functions of registers 8 and 20 of FIG. 1. The operation of this embodiment is according to FIG. 5, except that step 35 excludes re-compression, step 36 is redundant and step 37 excludes decompression.

Figure 8:
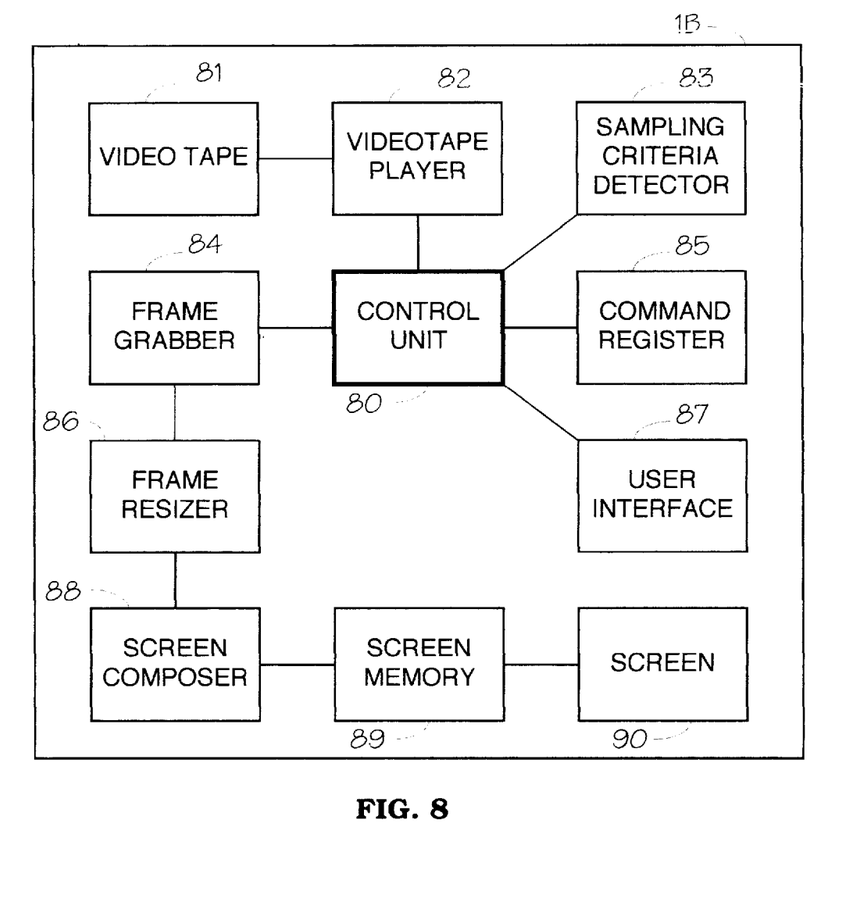
FIG. 8 is a block diagram of a third preferred embodiment of the present invention.

Reference is now made to FIG. 8, which describes a third preferred embodiment 1B of the present invention. In this preferred embodiment, the video source is an analog video tape rather than a digital video source as in the previously-described preferred embodiments.

Videotape player 82 reads analog video signals from video tape 81, e.g., a VCR cassette containing a movie from a video library or documenting a family event recorded by a home video camera. Control unit 80 controls the operation of player 82 according to user commands received via user interface 87 and stored in command register 85. Frame grabber 84 constructs full-screen video pictures from video signals received from video tape 81 via playe 82 and control unit 80. Frame resizer 86 transforms frames constructed by frame grabber 84 to sub-frames (22 in FIG. 2). Screen composer 88 composes full-screen pictures composed of several sub-frames, e.g., according to FIG. 3A or 3B. The pictures composed by screen composer 88 are stored in screen memory 89 and displayed on screen 90. Sampling criteria detector 83 selects the next frame to be handled by frame grabber 84 and/or frame resizer 86, according to the procedure of FIG. 9.

Figure 9:
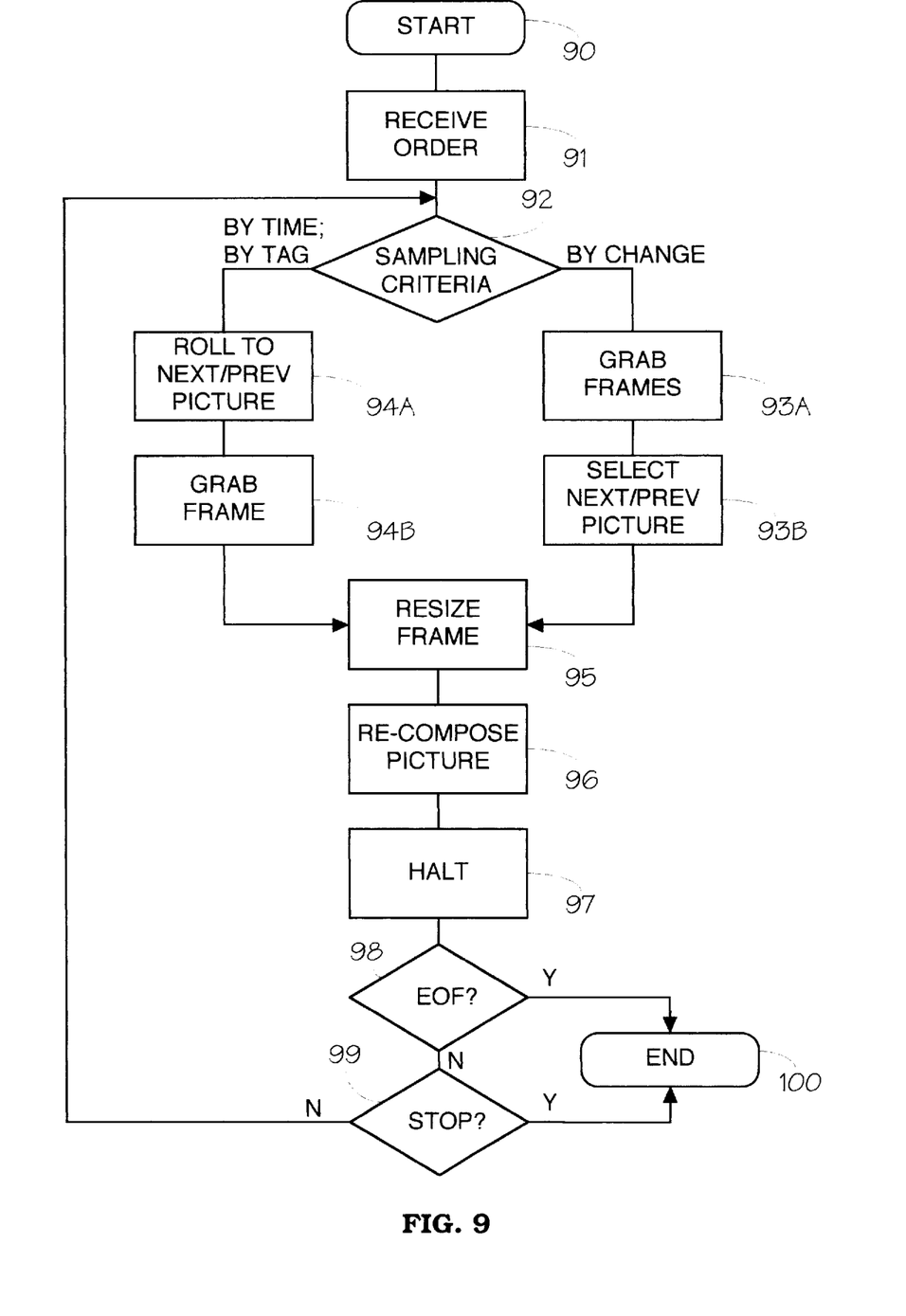
FIG. 9 is a flowchart describing the operation of the preferred embodiment of FIG. 8.

In the procedure of FIG. 9, a user's order is received in step 91, specifying criteria according to FIG. 4 to be stored in command register 85; criteria not specified explicitly retain pre-programmed, by-default values. In step 92, if transition criteria 24 of FIG. 4 are "by time" or "by tag", then in step 94A videotape player 82 rolls tape 81 to the next tagged or timed picture (or to the previous one, in case a rewind order has been included in step 91). It would be appreciated that including tags and timing data on video tapes is a common practice in commercial videotapes. Upon reaching the desired timing or tag, frame grabber 84 constructs, in step 94B, the selected picture.

If the transition criteria has been selected to be "by change", then in 93A consecutive video frames are grabbed, and preferably transformed into digital format for the relative change being processed and analyzed by sampling criteria detector 83, similarly to the techniques described in respect to FIGS. 5 and 6 above. Then, when reaching a specified threshold, the current picture is selected in 93B.

In step 95, the picture selected either through path 94A–94B or 93A–93B is resized to the size of the sub-frame according to FIG. 2 and criterion 26 of FIG. 4. In step 96, the full-screen picture, containing a number of sub-frames as specified is criteria 26, is recomposed according to criteria 27 of FIG. 4. This picture is kept still by control unit 80 for a predetermined delay in step 97. If neither the tape has reached its end in 98 or the user has stopped browsing in 99, the next frame is to be selected by returning to step 92.

While the invention has been described with respect to several preferred embodiments, it will be appreciated that these are set forth merely for purposes of example, and that the invention could be used in many other appications. For example and as indicated above, the invention could also be used for browsing through conventional film-type motion pictures. Also, the sampling rate and criteria can be varied according to the particular application, and the number "n" of frames simultaneously displayed on the viewer can be varied according to the desired time for viewing each frame; for example, the selected frames could be arranged according to a 2×2 matrix (wherein "n"=4), a 4×4 matrix (wherein "n"=16), etc. Further, the browsing system may include more than one sampling criterion, for example a combination of two or more of the above-mentioned criteria.

Many other variations, modifications and applications of the invention will be apparent.

What is claimed is:

1. A method of browsing through a motion picture by the use of a viewer having a screen, for locating desired segments in the motion picture, comprising:

selecting frames from sequential parts of the motion picture according to at least one predetermined sampling criterion;

reducing each of said selected frames in size such that said screen can accommodate the simultaneous display of a predetermined number "n" of frames;

and displaying said frames sequentially at "n" sequential locations on said screen according to a predefined closed loop, each of said frames being displayed in its respective location on the screen for a time interval starting with a time delay "$t_D$" of after the start of the display of the frame at its preceding location in the loop and continuing until the loop has been completed with another frame displayed in its respective location, such that only the frames selected according to said predetermined sampling criterion need be viewed in order to locate a desired segment in the motion picture, but each such frame may be viewed for an extended time interval, equal to the product of the number "n" and the time delay "$t_D$".

2. The method according to claim 1, wherein said predetermined sample criterion is "by time", said frames being selected according to predetermined sampling time intervals "$t_S$" in the motion picture.

3. The method according to claim 2, wherein said predetermined sampling time intervals "$t_S$" are equally-spaced time intervals each of between 1 and 20 seconds.

4. The method according to claim 3, wherein said equally-spaced time intervals "$t_S$" are each of approximately 5 seconds.

5. The method according to claim 1, wherein said predetermined sampling criterion is "by tags", said selected frames being pre-tagged in the motion picture.

6. The method according to claim 1, wherein said predetermined sampling criterion is "by change", said frames being selected when a predetermined characteristic of the frame changes from the preceding frame by a predetermined threshold.

7. The method according to claim 6, wherein said predetermined characteristic is a color characteristic of the frame.

8. The method according to claim 6, wherein said frames are selected according to both a "by change" criterion, and by a "time limit" criterion, the selection being made according to whichever criterion occurs first in the sequential parts of the motion picture.

9. The method according to claim 1, wherein said "n" sequential locations on said screen are located according to a two-dimensional matrix array.

10. The method according to claim 1, wherein each of said selected frames is reduced by a factor such that said screen can accommodate at any one time the "n" complete selected frames.

11. The method according to claim 1, wherein the margins of the selected frames are cropped to permit the screen to accommodate the uncropped portions of all the selected frames.

12. The method according to claim 1, wherein said motion pictures are video pictures stored in a storage device.

13. The method according to claim 12, wherein said motion pictures are stored in a central server and are displayed in a remote viewer connected by a communication link to the server.

14. The method according to claim 12, wherein said motion pictures are stored and viewed in a combined server-viewer unit.

15. The method according to claim 12, wherein said motion pictures are stored in compressed digital form.

16. The method according to claim 12, wherein said motion pictures are stored in analog form.

17. Apparatus for browsing through a motion picture for locating desired segments in the motion picture, comprising:

a viewer having a screen for viewing the motion picture;

a sampling criteria detector for selecting frames from sequential parts of the motion picture according to at least one predetermined sampling criterion;

a size-reducer for reducing in size each of said selected frames such that said screen can accommodate the simultaneous display of a predetermined number "n" of frames;

and a display control for displaying said frames sequentially at "n" sequential locations on said screen according to a predefined closed loop, each of said frames being displayed in its respective location on the screen for a time interval starting with a time delay "$t_D$" after the start of the display of the frame at its preceding location in the loop and continuing until the loop has been completed with another frame displayed in its respective location, such that only the frames selected according to said predetermined sampling criterion need be viewed in order to locate a desired segment in the motion picture, but each such frame may be viewed for an extended time interval, equal to the product of the number "n" and the time delay "$t_D$".

18. Apparatus according to claim 17, wherein said sampling criteria detector selects the frames "by time" according to a predetermined sampling time interval "$t_S$" in the motion picture.

19. The apparatus according to claim 17, wherein said sampling criteria detector selects the frames "by tag" according to tags pre-applied to the frames in the motion picture.

20. The apparatus according to claim 17, wherein said sampling criteria detector selects the frames "by change", according to a predetermined characteristic of the frame which changes from the preceding frame by a predetermined threshold.

21. The apparatus according to claim 20, wherein said predetermined characteristic is a color characteristic of the frame.

22. The apparatus according to claim 17, wherein said sampling criteria detector selects the frames according to both a "by change" criterion, and a "time limit" criterion, the selection being made whichever occurs first in the sequential parts of the motion picture.

23. The apparatus according to claim 17, wherein said display control displays said selected frames according to a two-dimensional matrix on said screen.

24. The apparatus according to claim 23, wherein said size-reducer reduces each of said selected frames in size by a factor of "n" such that said screen can accommodate at any one time the "n" complete selected frames.

25. The apparatus according to claim 23, wherein said size-reducer reduces each of said selected frames to a size greater than "n", but crops the margins of each of the selected frames to enable the screen to accommodate at any one time all said "n" selected frames.

26. The apparatus according to claim 25, wherein the apparatus further includes a user interface for inputting the desired frame size and crop criteria.

27. The apparatus according to claim 17, wherein said motion pictures are video pictures stored in a storage device.

28. The apparatus according to claim 27, wherein said motion pictures are stored in the form of compressed digital data, said apparatus further including a decompressor for decompressing the compressed digital data of the selected frames before the selected frames are reduced in size and displayed.

29. The apparatus according to claim 27, wherein said motion pictures are stored in the form of analog data, said apparatus further including a frame grabber for constructing the selected frames from the stored analog data before being reduced in size and displayed.

30. The apparatus according to claim 17, wherein said apparatus further includes a central server for storing said motion pictures, and a communication link connecting said central server to said viewer.

* * * * *